(12) United States Patent
Ritter et al.

(10) Patent No.: US 6,415,036 B1
(45) Date of Patent: Jul. 2, 2002

(54) APPARATUS FOR REDUCING VIBRATIONS GENERATED BY A LOUDSPEAKER IN A TELEVISION CABINET

(75) Inventors: Darin Bradley Ritter; Scott Joseph Duggan, both of Indianapolis, IN (US)

(73) Assignee: Thomson Licensing, S.A., Boulogne-Billancourt (FR)

( * ) Notice: Subject to any disclaimer, the term of this patent is extended or adjusted under 35 U.S.C. 154(b) by 0 days.

(21) Appl. No.: 09/644,960

(22) Filed: Aug. 24, 2000

(51) Int. Cl.[7] ................................................. H04R 1/02
(52) U.S. Cl. ........................ 381/388; 381/189; 381/333
(58) Field of Search ................................. 381/306, 333, 381/388, 353, 354, 334, 336, 189; H04N 5/640

(56) References Cited

U.S. PATENT DOCUMENTS

| | | |
|---|---|---|
| 3,571,509 A | 3/1971 | Cross et al. |
| 4,635,809 A | 1/1987 | Bachman et al. |
| 4,662,531 A | 5/1987 | Ramspacher |
| 5,033,802 A | 7/1991 | Fairbanks |
| 5,036,946 A | 8/1991 | Yoshino |
| 5,278,361 A | 1/1994 | Field |
| 5,822,443 A | 10/1998 | Kim |
| 5,887,959 A | 3/1999 | Yuri |
| 5,956,412 A * | 9/1999 | Park .......................... 381/386 |
| 5,999,233 A | 12/1999 | Park |
| 6,046,783 A | 4/2000 | Park |
| 6,067,362 A | 5/2000 | Lemanski |
| 6,173,064 B1 * | 1/2001 | Anagnos ..................... 381/353 |

* cited by examiner

*Primary Examiner*—Sinh Tran
(74) *Attorney, Agent, or Firm*—Joseph S. Tripoli; Robert D. Shedd; Frederick A. Wein

(57) ABSTRACT

An apparatus for minimizing sound vibrations in a television cabinet is disclosed. Specifically, the apparatus reduces the amount of vibrations generated by a loudspeaker that are transmitted into a television cabinet while maximizing sound energy transmitted from the cabinet. The apparatus includes an enclosure pod for accommodating at least one loudspeaker that is mounted in the television cabinet using vibration reducing devices.

5 Claims, 4 Drawing Sheets

APPARATUS FOR REDUCING VIBRATIONS GENERATED BY A LOUDSPEAKER IN A TELEVISION CABINET

The invention generally relates to an apparatus for mounting a loudspeaker in a television cabinet, and more particularly, to an apparatus for reducing sound vibrations transmitted from at least one loudspeaker into the television cabinet structure.

BACKGROUND OF THE INVENTION

Conventional projection televisions are typically housed in heavy wooden cabinets and are accompanied by high performance loudspeakers. Such heavy wooden cabinets usually have isolation enclosures formed therein to accommodate the high performance loudspeakers. The heavy weight of the typical projection television optics package and the wooden cabinet together prevent most vibration problems associated with the loudspeakers.

Presently, however, the market is demanding smaller television cabinet sizes while at the same time desiring larger screen sizes. Improvements in technology have made light-weight optics packages possible, resulting in the production of larger television screens. To meet the demand for smaller television cabinets, these improved projection television packages are being mounted in compact, stylized television cabinets known as "direct view" television cabinets. Such direct view cabinets are typically constructed using injection-molded plastic parts and are lighter and more aesthetically pleasing than heavy wooden cabinets. An undesirable result of the transition from heavier wooden cabinets to lighter plastic cabinets is the transmission of vibrations generated by the loudspeakers into the television cabinet. Such vibrations can deleteriously affect the optical components of the projection television resulting in unsatisfactory viewing conditions.

Therefore, there exists a need in the art for a vibration-reducing loudspeaker mounting apparatus for mounting loudspeakers in a television cabinet.

SUMMARY OF THE INVENTION

The disadvantages associated with the prior art are overcome by an apparatus for reducing sound vibrations generated by at least one loudspeaker in a television cabinet having optical components mounted therein.

Specifically, an apparatus according to an embodiment of the invention comprises an enclosure pod for mounting at least one loudspeaker therein, the pod having a plurality of mounting joints for mounting the pod in the television cabinet. The enclosure pod contacts the television cabinet only at the plurality of mounting joints, leaving a substantial air gap therebetween. Furthermore, the enclosure pod only contacts the television cabinet through vibration damping rubber isolation rings. As such, there is no direct contact between the enclosure pod and the television cabinet thereby reducing the direct transmission of vibrations generated by the loudspeakers into the television cabinet.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
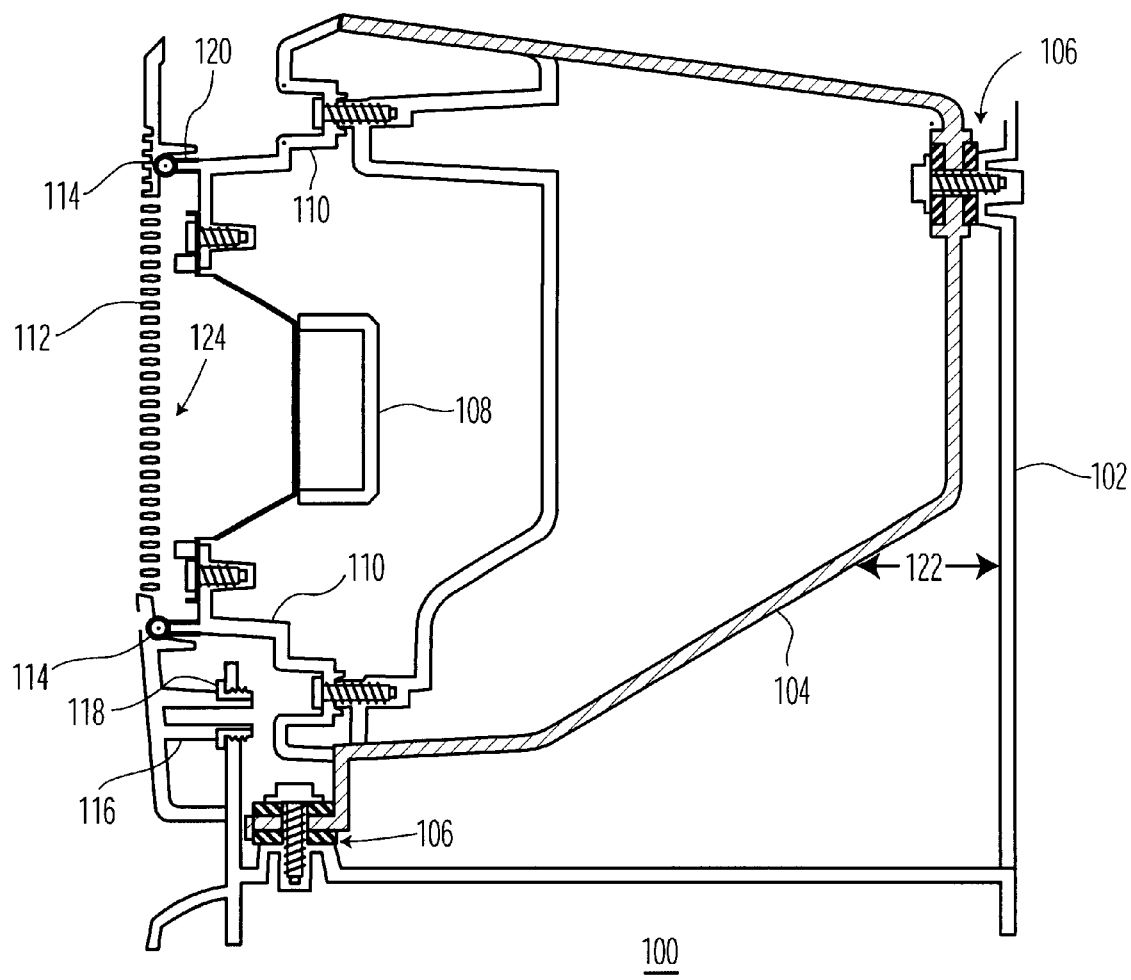
FIG. 1 depicts a cross sectional view of a loudspeaker mounting apparatus.

FIG. 1 depicts a cross sectional view of a loudspeaker mounting apparatus 100 for reducing the transmission of vibrations generated by a loudspeaker into a television cabinet. Although the preferred embodiment of the present invention is described below in regard to a compact, stylized television cabinet (hereinafter referred to as a "direct view" television cabinet), it should be understood that the present invention can be employed in television cabinets in general. Furthermore, the present invention can accommodate several loudspeaker configurations that include, but are not limited to, one midrange loudspeaker and one tweeter per audio channel.

The apparatus 100 is employed in a television cabinet 102 to reduce the transmission of vibrations generated by a loudspeaker 108 into the television cabinet 102. In one embodiment of the invention, the television cabinet 102 comprises a direct view form-factor cabinet that accommodates a projection style television. The television cabinet 102 is constructed using, illustratively, injection molded plastic parts that are prone to the transmission of vibrations which can deleteriously affect vibration sensitive components (not shown) such as the optical, electrical, and/or mechanical components of the projection television. Such vibration sensitive components include, but are not limited to, mirrors, light sources, and the like, which if vibrated, can cause the television picture to shake or momentarily become out of focus.

As shown in FIG. 1, the apparatus 100 of the present invention comprises an enclosure pod 104 having a speaker section 110, a flange 120 surrounding the speaker section 110, and a plurality of mounting joints 106 (two are shown). The loudspeaker 108 is mounted to the speaker section 110 of the enclosure pod 104. The enclosure pod 104 prevents sound energy generated behind the loudspeaker 108 from propagating into the television cabinet 102. The enclosure pod 104 is mounted to the television cabinet 102 so as to contact the cabinet 102 only at each of the plurality of mounting joints 106, leaving a substantial air gap 122 therebetween. The air gap 122 reduces the fluid structure interaction between the enclosure pod 104 and the television cabinet 102 thereby reducing the direct transmission of vibrations.

The television cabinet 102 includes a speaker mask 112 mounted to the cabinet 102 in front of the enclosure pod 104. A damping member 114 is mounted on the flange 120 of the enclosure pod 104 and is disposed between the speaker mask 112 and the enclosure pod 104. The speaker mask 112 presses against the damping member and forms an air channel 124 for both damping vibrations induced in the mask 112 and directing the sound energy outward away from the television cabinet 102. The damping member 114 comprises a rubber bulb channel gasket or like type elastic device suitable for damping vibrations transmitted from the loudspeaker to the speaker mask 112.

The speaker mask 112 is constructed using, illustratively, injection-molded plastic that is prone to the transmission of vibrations. The mask 112 includes a plurality of mounting posts 116 (one is shown) for mounting the mask 112 to the television cabinet 102. Each of the plurality of mounting posts 116 presses into a rubber grommet 118, or like type elastic device, that is disposed between each of the posts 116 and the television cabinet 102. As such, the rubber grommets 118 prevent vibrations induced in the speaker mask 112 from being transmitted into the television cabinet 102.

Figure 2:
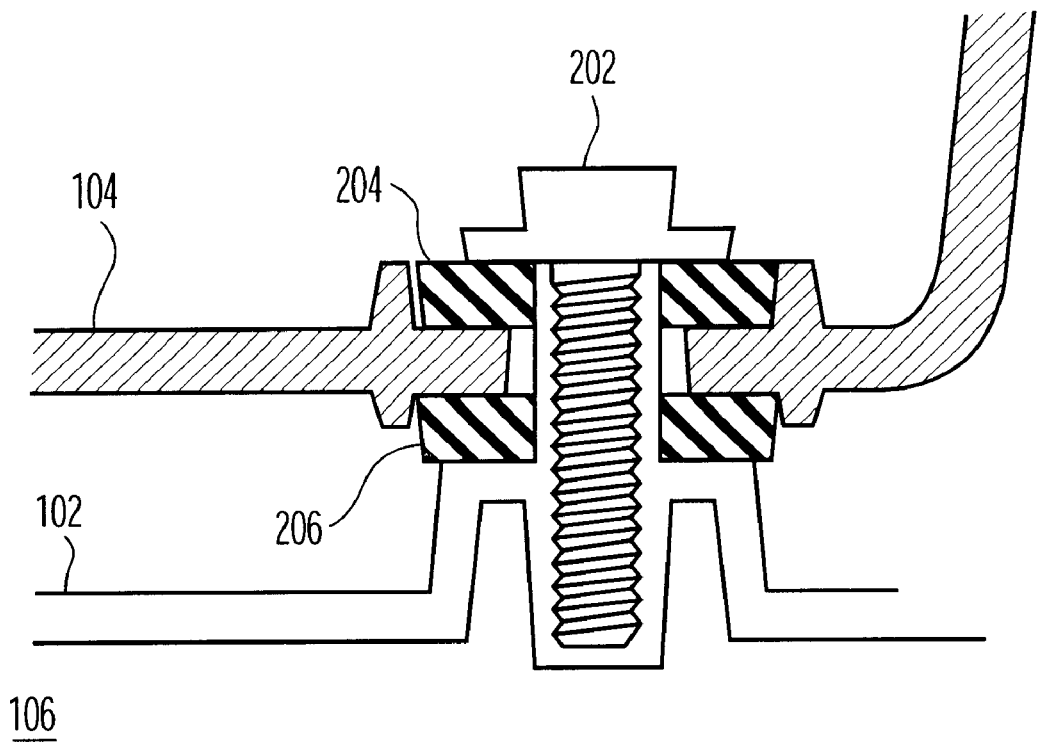
FIG. 2 depicts a detailed view of a vibration reducing mounting joint.

FIG. 2 depicts a detailed view of one of the plurality of mounting joints 106. A first rubber isolation ring 206 is disposed between the enclosure pod 104 and the television cabinet 102 to prevent hard plastic contact therebetween. The enclosure pod 104 is mounted to the television cabinet via a mounting screw 202 or like type securing device. A second rubber isolation ring 204 is disposed between the head of the mounting screw 202 and the enclosure pod 104. The enclosure pod 104 contacts the television cabinet 102 only at each of the plurality of mounting joints 106 and only through the first and second rubber isolation rings 206 and 204. As such, the direct transmission of vibrations from the enclosure pod 104 to the television cabinet 102 are thereby reduced. Those skilled in the art can readily devise alternative substitutes for either or both of the first or second rubber isolation rings 206 and 204, which include any elastic device.

Figure 3:
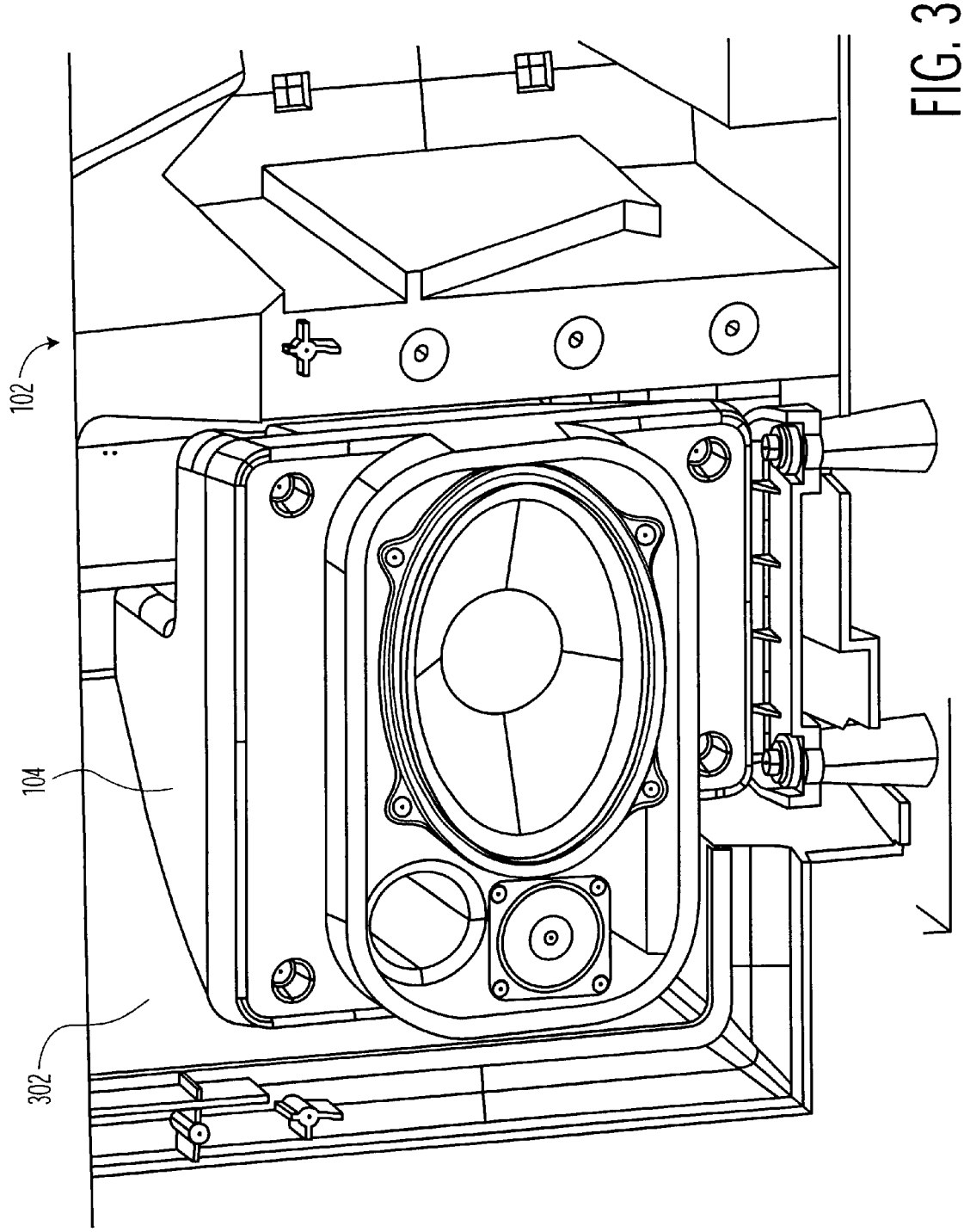
FIG. 3 shows a front perspective view of the apparatus of FIG. 1 mounted inside a television cabinet.
Figure 4:
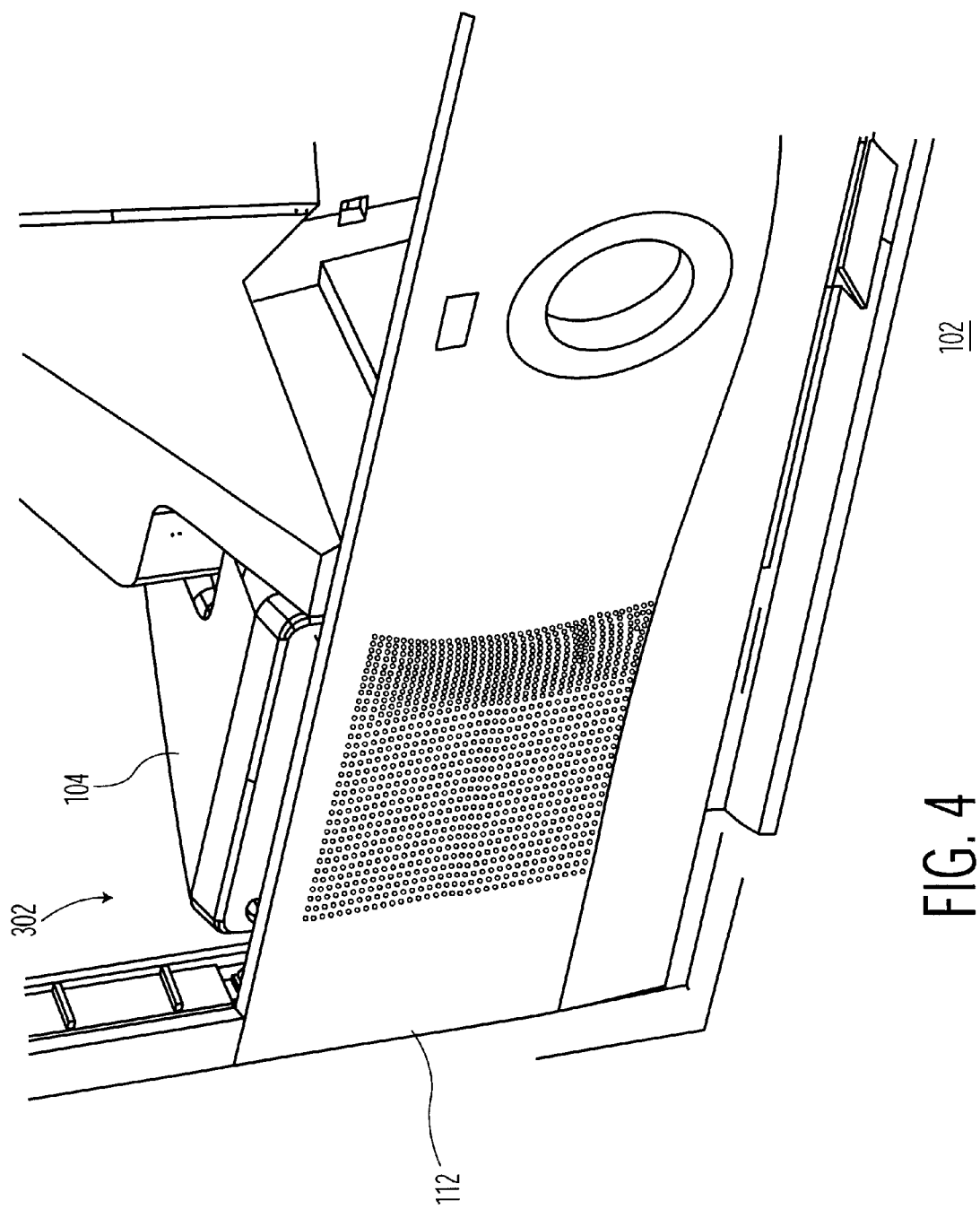
FIG. 4 depicts the apparatus of FIG. 1 mounted inside a television cabinet with a speaker mask.

FIG. 3 illustrates a front perspective view of the loudspeaker mounting apparatus 100 of the present invention mounted in the television cabinet 102. The enclosure pod 104 in mounted in a loudspeaker enclosure section 302 of the television cabinet 102. FIG. 4 illustrates the apparatus 100 of the present invention mounted in the television cabinet 102 with the speaker mask 112.

Although various embodiments which incorporate the teachings of the present invention have been shown and described in detail herein, those skilled in the art can readily devise many other varied embodiments that still incorporate these teachings.

What is claimed is:

1. In a television cabinet having vibration sensitive components mounted therein, an apparatus for minimizing sound vibrations in the television cabinet from at least one loudspeaker, said apparatus comprising:

an enclosure pod having a loudspeaker section for supporting said at least one loudspeaker and a plurality of mounting joints; and vibration reducing means for mounting said enclosure pod to said television cabinet at each of said plurality of mounting joints;

said enclosure pod contacting said television cabinet only via said plurality of mounting joints;

a damping member mounted to said enclosure pod and surrounding said loudspeaker section;

a mask having a plurality of mounting posts for mounting said mask to said television cabinet, said mask being in contact with said damping member to form an air channel for isolating sound energy emitted from said at least one loudspeaker from said television cabinet; and a second vibration reducing means for mounting said mask to said television cabinet at each of said plurality of mounting posts.

2. The television cabinet of claim 1 wherein said vibration reducing means comprises:

a first rubber isolation ring disposed between each of said plurality of mounting joints and said enclosure pod; and a second rubber isolation ring disposed between each of said plurality of mounting joints and said television cabinet.

3. The television cabinet of claim 1 wherein said damping member comprises a rubber bulb channel gasket.

4. The television cabinet of claim 1 wherein said second vibration reducing means comprises a rubber grommet disposed between each of said plurality of mounting posts and said television cabinet.

5. The television cabinet of claim 1 wherein said vibration sensitive components comprise optical components.

* * * * *